United States Patent [19]

D'Avello et al.

[11] Patent Number: 4,462,098
[45] Date of Patent: Jul. 24, 1984

[54] RADIO FREQUENCY SIGNAL COMBINING/SORTING APPARATUS

[75] Inventors: Robert F. D'Avello, Schaumburg; Raymond L. Sokola, Lake Zurich, both of Ill.

[73] Assignee: Motorola, Inc., Schaumburg, Ill.

[21] Appl. No.: 349,348

[22] Filed: Feb. 16, 1982

[51] Int. Cl.³ .......................... H04J 1/02; H04B 1/50
[52] U.S. Cl. .................................. 370/30; 370/123; 333/134; 333/206
[58] Field of Search ............... 370/30, 38, 69.1, 123; 333/132, 134, 222, 223, 202, 206, 219

[56] References Cited

U.S. PATENT DOCUMENTS

| | | | |
|---|---|---|---|
| 3,332,038 | 7/1967 | Stanley | 370/69.1 |
| 3,413,577 | 11/1968 | Massano | 333/82 |
| 3,691,487 | 9/1972 | Yoshimoto | 333/73 R |
| 3,713,051 | 2/1973 | Kell | 333/73 R |
| 3,728,731 | 4/1973 | Choi et al. | 343/180 |
| 3,733,608 | 5/1973 | McGhay et al. | 370/30 |
| 3,798,578 | 3/1974 | Konishi et al. | 333/83 T |
| 3,811,101 | 5/1974 | Karp | 334/42 |
| 3,938,064 | 2/1976 | O'Bryan, Jr. et al. | 333/73 S |
| 3,973,226 | 8/1976 | Affolter et al. | 333/73 R |
| 4,101,854 | 7/1978 | Gikow | 333/82 B |
| 4,136,320 | 1/1979 | Nishikawa et al. | 333/82 BT |
| 4,179,673 | 12/1979 | Nishikawa et al. | 333/204 |
| 4,223,287 | 9/1980 | Nishikawa et al. | 333/206 |
| 4,228,539 | 10/1980 | Hamalainen | 455/124 |
| 4,264,881 | 4/1981 | DeRonde | 333/110 |
| 4,268,809 | 5/1981 | Makimoto et al. | 333/202 |
| 4,283,697 | 8/1981 | Masuda et al. | 333/202 |
| 4,287,494 | 9/1981 | Hashimoto et al. | 333/202 |
| 4,292,610 | 9/1981 | Makimoto et al. | 333/222 |
| 4,342,972 | 8/1982 | Nishikawa et al. | 333/206 |

OTHER PUBLICATIONS

"Coaxial Filters-A Practical Design Technique" by J. F. Lally and R. R. Ciehoski-Electronics-Aug. 30, 1963, pp. 35 and 36.

"A New $BaO-TiO_2$ Compound with Temperature-Stable High Permitivity and Low Microwave Loss" by H. M. O'Bryan, Jr., and J. Thomson, Jr. Journal of the American Ceramic Society-O'Bryan et al.-vol. 57, No. 10, Oct. 1974.

"$Ba_2Ti_9O_{20}$ as a Microwave Dielectric Resonator" by J. K. Plourde and D. F. Linn et al.-Journal of the American Ceramic Society, vol. 57, No. 10 Oct. 1974.

"Microwave Dielectric Resonator Filters Utilizing $Ba_2Ti_9O_{20}$ Ceramics" by J. K. Plourde and D. F. Linn-1977 IEEE MTT-S International Microwave Symposium Digest, pp. 1-4.

"The Ternary Systems $BaO-TiO_2-SnO_2$ and $BaO-TiO_2-ZrO_2$" by G. H. Jonker and W. Kwestroo-Journal of American Ceramic Society vol. 41/10, pp. 390 through 394.

Primary Examiner—Douglas W. Olms
Attorney, Agent, or Firm—Rolland R. Hackbart; Edward M. Roney, III; James W. Gillman

[57] ABSTRACT

A unique RF signal combining/sorting apparatus is disclosed that includes first and second filters each comprised of one or more bandstop/bandpass filters intercoupled by transmission lines. The bandstop/bandpass filters include a shunt inductor or capacitor and a dielectric block having an input electrode plated on its top surface and a hole located at predetermined distance from the input electrode. The dielectric material is preferably a ceramic comprised of BaO, $TiO_2$ and $ZrO_2$. The dielectric block is entirely plated with copper or silver except for a portion of the top surface surrounding the hole and electrode and is essentially a capacitively coupled, short-circuited coaxial transmission line. Each of the first and second filters is tuned to pass the frequencies of one signal and attenuate the frequencies of the signal passed by the other. The unique RF signal combining/sorting apparatus can be configured as a multi-signal combiner, multi-signal sorter, or multi-signal combiner/sorter. This feature of the unique RF signal combining/sorting apparatus renders it particularly well suited for use as an antenna duplexer for radio transmitters and receivers.

40 Claims, 8 Drawing Figures

RADIO FREQUENCY SIGNAL COMBINING/SORTING APPARATUS

BACKGROUND OF THE INVENTION

The present invention is related generally to radio frequency (RF) signal multiplexing apparatus, and more particularly to improved RF signal combining/sorting apparatus that is particularly well adapted for use in antenna duplexers for mobile, portable and fixed station radios.

Conventional RF signal duplexers typically consist of a conductive enclosure having two filters each comprised of a plurality of cells including a resonator of the helical type as shown and described in U.S. Pat. No. 3,728,731 or the coaxial type. The helical and coaxial resonators are essentially foreshortened short-circuited quarter-wavelength transmission lines. The resonators may be inductively coupled one to another by apertures in their common walls. Each resonator can be tuned by means of a tuning screw which inserts into a hole extending through the middle of the resonator. Once tuned, the overall response of the duplexer is determined by the size of the interstage coupling apertures. Since the tuning of the resonantors can be disturbed by a slight adjustment of the tuning screw, a lock nut is required to keep the tuning screw properly positioned at all times. The use of tuning screws not only renders the duplexer susceptible to becoming de-tuned, but also creates additional problems including mechanical locking of the tuning screw and arcing between the tuning screw and the resonator structure. Furthermore, these duplexers tend to be rather bulky, and therefore are relatively unattractive for applications where size is an important factor.

SUMMARY OF THE INVENTION

Accordingly, it is an object of the present invention to provide improved RF signal combining/sorting apparatus that is smaller than prior art multiplexers and duplexers.

It is another object of the present invention to provide improved RF signal combining/sorting apparatus that exhibits superior temperature stability.

It is yet another object of the present invention to provide improved RF signal combining/sorting apparatus that is easier to manufacture than prior art multiplexers and duplexers.

It is a further object of the present invention to provide improved RF signal combining/sorting apparatus that can be automatically tuned.

According to an embodiment of the present invention, RF signal combining/sorting apparatus includes first and second filters each comprised of one or more bandstop/bandpass filters intercoupled by transmission lines. The bandstop/bandpass filters include a shunt inductor or shunt capacitor and a dielectric block having an input electrode plated on a first surface and a hole located at a predetermined distance from the input electrode that extends to a second surface of the dielectric block. The dielectric block is further plated with a conductive material on all surfaces except for the top surface. Each of the two filters is tuned to pass the frequencies of one signal and attenuate the frequencies of the signal passed by the other filter.

DETAILED DESCRIPTION OF THE PREFERRED EMBODIMENTS

Figure 1:
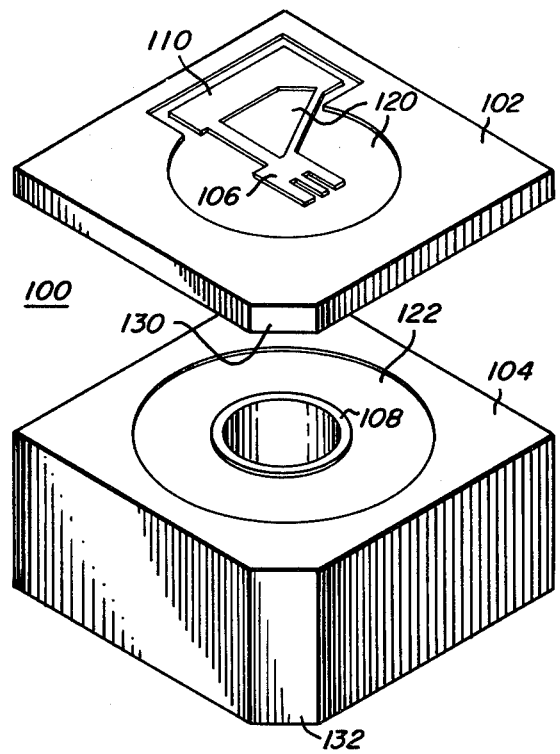
FIG. 1 is a prespective view of a ceramic bandstop/bandpass filter that may be utilized in the RF signal combining/sorting apparatus of the present invention.

In FIG. 1, there is illustrated a ceramic bandstop/bandpass filter 100 that may advantageously be utilized in the RF signal combining/sorting apparatus of the present invention. Filter 100 includes a top plate 102 and block 104 which are both comprised of a dielectric material that is selectively plated with a conductive material. Filter 100 can be constructed of any suitable dielectric material that has low loss, a high dielectric constant and a low temperature coefficient of the dielectric constant. In a preferred embodiment, filter 100 is comprised of a ceramic compound including barium oxide, titanium oxide and zirconium oxide, the electrical characteristics of which are described in more detail in an article by G. H. Jonker and W. Kwestroo, entitled "The Ternary Systems $BaO\text{-}TiO_2\text{-}SnO_2$ and $BaO\text{-}TiO_2\text{-}ZrO_2$", published in the Journal of the American Ceramic Society, volume 41, number 10, at pages 390–394. Of the ceramic compounds described in this article, the compound in Table VI having the composition 18.5 1 mole % BaO, 77.0 mole % $TiO_2$ and 4.5 mole % $ZrO_2$ and having a dielectric constant of 40 is well suited for use in the ceramic filters in the RF signal combining/sorting apparatus of the present invention.

Referring to FIG. 1, the top plate 102 and block 104 of filter 100 are plated with an electrically conductive material, such as copper or silver, with the exception of unplated areas 120 and 122, respectively. Block 104 of filter 100 includes a hole 108 that extends from its top surface to its bottom surface. Hole 108 is likewise plated with an electrically conductive material, and the plating of hole 108 is electrically connected to the plating on the bottom surface of block 104. When plated and coupled to signal ground, block 104 is essentially a short-circuited coaxial transmission line having a length selected for desired filter response characteristics.

Figure 3:
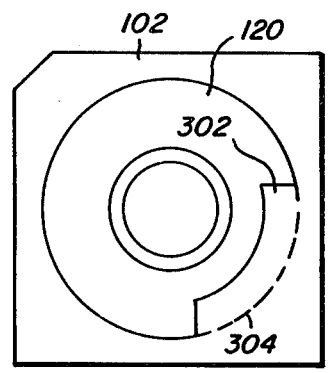
FIG. 3 is a bottom view of the top plate of the ceramic bandstop/bandpass filter in FIG. 1.

Top plate 102 in FIG. 1 includes an input electrode 106 that has a plurality of fingers. Input electrode 106 can be coupled to an input signal from a signal source, which in turn is capacitively coupled from input electrode 106 to the coaxial transmission line provided by block 104. The amount of capacitance between input electrode 106 and block 104 can be adjusted by manually or automatically trimming the fingers of electrode 106. For example, a laser could be used to accurately trim the fingers of electrode 106. Input electrode 106 is also coupled by two plating runners to electrode 110, which is the top electrode of a shunt capacitor. Electrode 110 and plating area 302 in FIG. 3 on the bottom surface of plate 102, together form a shunt capacitor. As illustrated in FIG. 3, the plating on the bottom of plate 102 is substantially identical to the plating on the top of block 104 with the exception of area 302. If electrode 110 is not present on plate 102, the plating on the bottom of plate 102 in FIG. 3 extends only to dashed line 304 (area 120 being unplated).

Both top plate 102 and block 104 in FIG. 1 have a substantially square cross section. In an embodiment of filter 100 operable in the 453 to 458 mHz frequency range, each side of top plate 102 and block 104 has a length of 35.1 mm., the height of top plate 102 is 2.93 mm., the height of block 104 is 18.9 mm., and the diameter of hole 108 is 10.7 mm. Top plate 102 and block 104 also have beveled edges 130 and 132, respectively, to insure they are properly aligned when they are fixedly attached together by soldering or other means. Although shown with a rectangular shape in FIG. 1, ceramic filter 100 can have any suitable irregular or regular shape, such as, for example, the shape of a cylinder or a parallelepiped.

Figure 2:
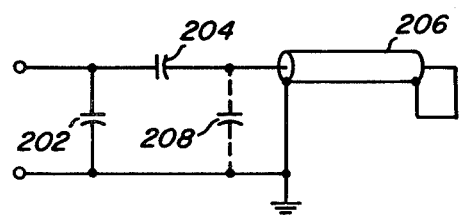
FIG. 2 is an electrical circuit diagram for the ceramic bandstop/bandpass filter in FIG. 1.

Referring to FIG. 2, there is illustrated an equivalent circuit diagram for the ceramic bandstop/bandpass filter 100 in FIG. 1. An input signal from a signal source is applied to input electrode 106 in FIG. 1, which corresponds to capacitor 204 in FIG. 2. Capacitor 202 in FIG. 2 corresponds to the capacitance provided by electrodes 110 and 302 on plate 102 in FIGS. 1 and 3, respectively. Capacitor 208 represents the stray capacitance that exists between the ground plating on the top surface of block 104 and hole 108 in FIG. 1. Coaxial transmission line 206 in FIG. 2 corresponds to block 104 in FIG. 1. The frequency response of filter 100 in FIG. 1 is characterized by a passband of frequencies and a stopband of frequencies which are greatly attentuated with respect to the passband of frequencies. Inclusion of shunt capacitor 202 causes the passband of frequencies to be located above the stopband of frequencies.

Figure 4:
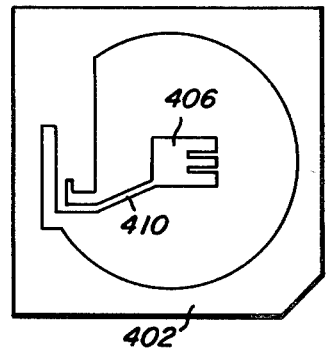
FIG. 4 is a top view of another top plate for the ceramic bandstop/bandpass filter in FIG. 1.

If it is desired to have the passband of frequencies below the stopband of frequencies, the shunt capacitor 202 can be replaced by a shunt inductor. A shunt inductor can be provided by a transmission line, such as strip electrode 410 which is plated on the top plate 402 as illustrated in FIG. 4. Strip electrode 410 is connected between input electrode 406 and the surrounding plated area which is in turn coupled to signal ground when attached to block 104 in FIG. 1. The equivalent circuit diagram for such a filter is illustrated in FIG. 6, where inductor 602 corresponds to strip electrode 406 in FIG. 4.

Figure 5:
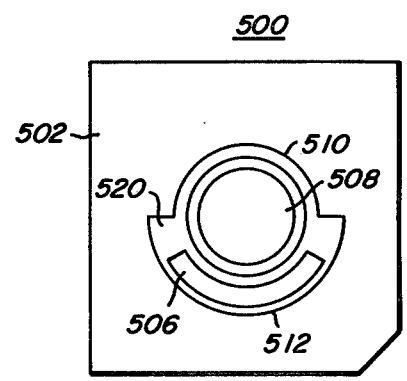
FIG. 5 is a top view of another ceramic bandstop filter that may be utilized in the RF signal combining/sorting apparatus of the present invention.

According to yet another embodiment of ceramic filter 100 in FIG. 1, a ceramic bandstop filter 500 can be provided by a single plated block 502 of dielectric material as illustrated in FIG. 5. Block 502 in FIG. 5 has a hole 508 and is plated with a conductive material with the exception of unplated area 520. Input electrode 506 capacitively couples an input signal to the short-circuited coaxial transmission line provided by block 502. In an embodiment of filter 500 operable in the 453 to 458 mHz frequency range, each side of block 502 has a length of 35.1 mm., the height of block 502 is 22.35 mm., and the diameter of hole 508 is 10.7 mm.

Figure 7:
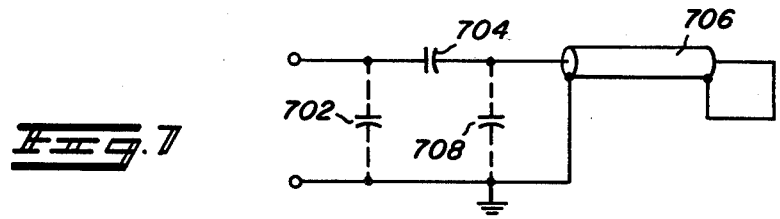
FIG. 7 is an electrical circuit diagram for the ceramic bandstop/bandpass filter in FIG. 5.

The equivalent circuit diagram for block 502 is shown in FIG. 7. Capacitor 704 represents the capacitance between input electrode 506 and the plating of hole 508 in FIG. 5. Capacitor 702 represents the stray capacitance between input electrode 506 and the edge 512 of the surrounding plating, and capacitor 708 represents the stray capacitance between hole 508 and the edge 510 of surrounding plating of block 502 in FIG. 5. The magnitude of capacitors 702 and 708 can be adjusted by adding or removing plating at edges 512 and 510, respectively. Coaxial transmission line 706 corresponds to block 502 in FIG. 5. The frequency response of block 502 in FIG. 5 is characterized by a stopband of frequencies which are greatly attenuated with respect to frequencies outside the stopband.

Figure 6:
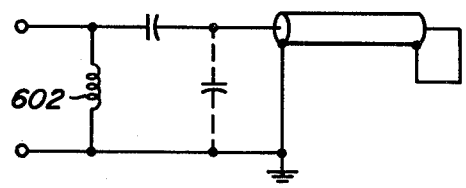
FIG. 6 is an electrical circuit diagram for the ceramic bandstop filter in FIG. 4.

Ceramic filter 500 in FIG. 5 can likewise be converted to a bandstop/bandpass filter by interconnecting input electrode 506 with a shunt capacitor or shunt inductor as illustrated in FIGS. 2 and 6, respectively. The shunt inductor can be a discrete component or can be plated on the top surface of block 502 as shown in FIG. 4. The shunt capacitor can be a discrete component or can be provided by capacitor 702 in FIG. 5, which represents the capacitance between input electrode 506 and the surrounding ground plating.

Figure 8:
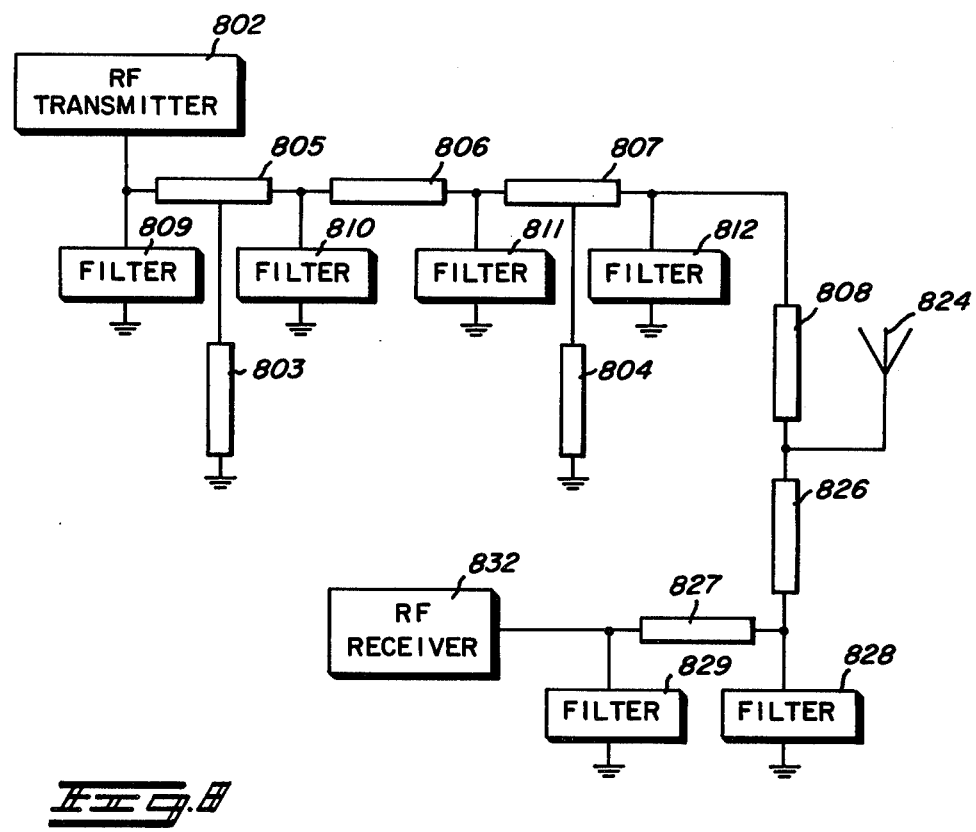
FIG. 8 is a block diagram of an antenna duplexer embodying the present invention.

In an embodiment of the present invention, two or more ceramic bandpass/bandstop filters 100 in FIG. 1 and/or 500 in FIG. 5 can be arranged to provide apparatus that combines and/or frequency sorts two RF signals into and/or from a composite RF signal. For example, one application of the RF signal combining-/sorting apparatus of the present invention is an antenna duplexer which couples a transmit signal from an RF transmitter to an antenna and a receive signal from the antenna to an RF receiver, as illustrated in FIG. 8. In FIG. 8, a duplexer couples RF transmitter 802 and RF receiver 832 to antenna 824. The duplexer is made up of a transmitter filter including circuit elements 803-812 and a receiver filter including circuit elements 826-829. The transmitter filter 803-812 includes four ceramic bandstop or bandstop/bandpass filters 809-812 which are intercoupled by quarter-wave transmission lines 805-807. The stopband of frequencies for filters 809-812 includes the frequency of the receive signal, and the stopband of frequencies for filters 828 and 829 includes the frequency of the transmit signal. If ceramic bandstop/bandpass filters are used, filters 809-812 include shunt inductors and filters 828 and 829 include shunt capacitors when the frequency of the transmit signal is below the frequency of the receive signal, and vice versa when the frequency of the transmit signal is greater than the frequency of the receive signal.

Filters 812 and 828 are coupled to antenna 824 by way of quarter-wave transmission lines 808 and 826, respectively. Although transmitter filter 803-812 includes four ceramic filters 809-812 and receiver filter 826-829 includes two ceramic filters 828 and 829, any number of ceramic filters can be utilized in the inventive RF signal combining/sorting apparatus depending upon the electrical characteristics desired.

The transmitter filter 803-812 also includes shorted transmission lines 803 and 804 positioned at the midpoint of transmission lines 805 and 807, respectively, for suppressing harmonic frequencies generated by RF transmitter 802. Transmission lines 803 and 804 have a length equal to a quarter-wavelength at the frequency of the transmit signal. Therefore, transmission lines 803 and 804 are open circuits at the transmit signal frequency and short circuits at even harmonics of the transmit signal frequency. Thus, the even order harmonics of the transmit signal frequency are greatly attentuated by transmission lines 803 and 804. Depending on the desired electrical characteristics, one or more shorted transmission lines 803 and 804 can be positioned at the output of RF transmitter, or at any suitable point along transmission lines 805-808.

In an embodiment of the inventive RF signal combining/sorting apparatus in FIG. 8, transmit signals having a frequency range from 453 to 457.475 mHz and receive signals having a frequency range from 463 to 467.475 mHz were coupled to the antenna of a mobile radio. The ceramic bandstop/bandpass filters 809-812 in the transmitter filter 803-812, and the ceramic bandstop/bandpass filters 828 and 829 in the receiver filter 826-829 were of the type shown in FIG. 5 with external inductors and capacitors, respectively. The transmitter filter 803-812 had an insertion loss of 1.6 dB and attenuated receive signals by at least 63 dB. The receive filter 826-829 had an insertion loss of 1.5 dB and attenuated transmit signals by at least 40 dB. By arranging the six ceramic bandstop/bandpass filters 809-812, 828 and 829 side by side and coupling them to transmission lines 803-808, 826 and 827 on a circuit board on top of the six filters, the combining/sorting apparatus can be provided in a space only slightly bigger than that occupied by the six filters themselves.

In summary, an improved RF signal combining/sorting apparatus has been described that is more reliable and smaller than prior art multiplexers and duplexers. The simple construction of the RF signal combining/sorting apparatus of the present invention renders it easy to manufacture. The inventive RF signal combining/sorting apparatus can be configured as a multi-signal combiner, a multi-signal sorter, or a multi-signal combiner/sorter simply by adjusting the frequency response characteristics of the bandstop/bandpass ceramic filters therein. The signal combining and sorting features of the present invention can be advantageously utilized in any suitable application requiring multiplexing and/or de-multiplexing of RF signals. This feature of the present invention renders it particularly well suited for use as an antenna duplexer for radio transmitters and receivers.

We claim:

1. Apparatus for coupling a first signal from a signal source to output means and coupling a second signal from the output means to a signal sink, said apparatus comprising:
   (a) first filtering means for coupling the first signal from the signal source to the output means, said first filtering means including at least one bandstop filtering means intercoupled by transmission line means for attenuating signals having frequencies in a stopband of frequencies including the frequency of the second signal, said bandstop filtering means comprised of:
      (i) means comprised of a dielectric material and having top and bottom surfaces, said dielectric means further including a hole extending from the top surface to the bottom surface thereof, said dielectric means further being covered entirely with conductive material with the exception of the top surface, and said conductive material being coupled to signal ground; and
      (ii) capacitive means including input electrode means comprised of a conductive material disposed on the top surface of the dielectric means at a predetermined distance from the hole in the dielectric means; and
   (b) second filtering means for coupling the second signal from the output means to the signal sink, said second filtering means including at least one bandstop filtering means intercoupled by transmission line means for attenuating signals having frequencies in a stopband of frequencies including the frequency of the first signal, said bandstop filtering means comprised of:
      (i) means comprised of a dielectric material and having top and bottom surfaces, said dielectric means further including a hole extending from the top surface to the bottom surface thereof, said dielectric means further being covered entirely with a conductive material with the exception of the top surface, and said conductive material being coupled to signal ground; and
      (ii) capacitive means including input electrode means comprised of a conductive material disposed on the top surface of the dielectric means at a predetermined distance from the hole in the ceramic means.

2. The apparatus according to claim 1, wherein each of the bandstop filtering means in said first filtering means further includes shunt inductive means coupled between the input electrode means and signal ground, and wherein each of the bandstop filtering means in the second filtering means includes shunt capacitive means coupled between the input electrode means and signal ground.

3. The apparatus according to claim 1, wherein each of the bandstop filtering means in said first filtering means further includes shunt capacitive means coupled between the input electrode means and signal ground, and wherein each of the bandstop filtering means in the second filtering means includes shunt inductive means coupled between the input electrode means and signal ground.

4. The apparatus according to claim 2 or 3, wherein said shunt inductive means includes strip electrode means comprised of a conductive material plated on the top surface of the dielectric means, one end of the strip electrode means being coupled to the input electrode means, and the other end of the strip electrode means coupled to signal ground; and wherein said shunt capacitive means includes electrode means comprised of a conductive material disposed on the top surface of the dielectric means at a predetermined distance from the electrode means of the capacitive means and being coupled to signal ground.

5. The apparatus according to claim 1, wherein said first filtering means includes transmission line means coupled between the signal source and signal ground, said transmission line means having a length such that its impedance is a maximum at the frequency of the first signal.

6. The apparatus according to claim 1 or 5, wherein said first filtering means includes transmission line means coupled between the bandstop filtering means and signal ground, said transmission line means having a length such that its impedance is a maximum at the frequency of the first signal.

7. The apparatus according to claim 1, 2 or 3, wherein the signal source comprises radio frequency (RF) transmitting means, the signal sink comprises RF receiving means and the output means comprises RF signal radiating means.

8. Apparatus for coupling a first signal from a first signal source and a second signal from a second signal source to output means, said apparatus comprising:
(a) first filtering means for coupling the first signal from the first signal source to the output means, said first filtering means including at least one bandstop filtering means intercoupled by transmission line means for attenuating signals having frequencies in a stopband of frequencies including the frequency of the second signal, said bandstop filtering means comprised of:
  (i) means comprised of a dielectric material and having top and bottom surfaces, said dielectric means further including a hole extending from the top surface to the bottom surface thereof, said dielectric means further being covered entirely with conductive material with the exception of the top surface, and said conductive material being coupled to signal ground; and
  (ii) capacitive means including input electrode means comprised of a conductive material disposed on the top surface of the dielectric means at a predetermined distance from the hole in the dielectric means; and
(b) second filtering means for coupling the second signal from the second signal source to the output means, said second filtering means including at least one bandstop filtering means intercoupled by transmission line means for attenuating signals having frequencies in a stopband of frequencies including the frequency of the first signal, said bandstop filtering means comprised of:
  (i) means comprised of a dielectric material and having top and bottom surfaces, said dielectric means further including a hole extending from the top surface to the bottom surface thereof, said dielectric means further being covered entirely with a conductive material with the exception of the top surface, and said conductive material being coupled to signal ground; and
  (ii) capacitive means including input electrode means comprised of a conductive material disposed on the top surface of the dielectric means at a predetermined distance from the hole in the ceramic means.

9. The apparatus according to claim 8, wherein each of the bandstop filtering means in said first filtering means further includes shunt inductive means coupled between the input electrode means and signal ground, and wherein each of the bandstop filtering means in the second filtering means includes shunt capacitive means coupled between the input electrode means and signal ground.

10. The apparatus according to claim 8, wherein each of the bandstop filtering means in said first filtering means further includes shunt capacitive means coupled between the input electrode means and signal ground, and wherein each of the bandstop filtering means in the second filtering means includes shunt inductive means coupled between the input electrode means and signal ground.

11. The apparatus according to claim 9 or 10, wherein said shunt inductive means includes strip electrode means comprised of a conductive material plated on the top surface of the first dielectric means, one end of the strip electrode means being coupled to the input electrode means, and the other end of the strip electrode means being coupled to signal ground; and wherein said shunt capacitive means includes electrode means comprised of a conductive material disposed on the top surface of the dielectric means at a predetermined distance from the electrode means of the capacitive means and being coupled to signal ground.

12. The apparatus according to claim 8, wherein said first filtering means includes transmission line means coupled between the signal source and signal ground, said transmission line means having a length such that its impedance is a maximum at the frequency of the first signal.

13. The apparatus according to calim 8 or 12, wherein said first filtering means includes transmission line means coupled between the bandstop filtering means and signal ground, said transmission line means having a length such that its impedance is a maximum at the frequency of the first signal.

14. The apparatus according to claim 8, wherein said second filtering means includes transmission line means coupled between the signal source and signal ground, said transmission line means having a length such that its impedance is a maximum at the frequency of the first signal.

15. The apparatus according to claim 8 or 14, wherein said second filtering means includes transmission line means coupled between the bandstop filtering means and signal ground, said transmission line means having a length such that its impedance is a maximum at the frequency of the first signal.

16. The apparatus according to claim 8, 9 or 10, wherein the first signal source comprises first radio frequency (RF) transmitting means, the second signal source comprises second RF transmitting means and the output means comprises RF signal radiating means.

17. Apparatus for coupling a first signal from input means to a first signal sink and coupling a second signal from the input means to a second signal sink, said apparatus comprising:
(a) first filtering means for coupling the first signal from the input means to the first signal sink, said first filtering means including at least one bandstop filtering means intercoupled by transmission line means for attenuating signals having frequencies in a stopband of frequencies including the frequency of the second signal, said bandstop filtering means comprised of:
  (i) means comprised of a dielectric material and having top and bottom surfaces, said dielectric means further including a hole extending from the top surface to the bottom surface thereof, said dielectric means further being covered entirely with conductive material with the exception of the top surface, and said conductive material being coupled to signal ground; and
  (ii) capacitive means including input electrode means comprised of a conductive material disposed on the top surface of the dielectric means at a predetermined distance from the hole in the dielectric means; and
(b) second filtering means for coupling the second signal from the input means to the second signal sink, said second filtering means including at least one bandstop filtering means intercoupled by transmission line means for attenuating signals having frequencies in a stopband of frequencies including the frequency of the first signal, said bandstop filtering means comprised of:

(i) means comprised of a dielectric material and having top and bottom surfaces, said dielectric means further including a hole extending from the top surface to the bottom surface thereof, said dielectric means further being covered entirely with a conductive material with the exception of the top surface, and said conductive material being coupled to signal ground; and (ii) capacitive means including input electrode means comprised of a conductive material disposed on the top surface of the dielectric means at a predetermined distance from the hole in the dielectric means.

18. The apparatus according to claim 17, wherein each of the bandstop filtering means in said first filtering means further includes shunt inductive means coupled between the input electrode means and signal ground, and wherein each of the bandstop filtering means in the second filtering means includes shunt capacitive means coupled between the input electrode means and signal ground.

19. The apparatus according to claim 17, wherein each of the bandstop filtering means in said first filtering means further includes shunt capacitive means coupled between the input electrode means and signal ground, and wherein each of the bandstop filitering means in the second filtering means includes shunt inductive means coupled between the input electrode means and signal ground.

20. The apparatus according to claim 18 or 19, wherein said shunt inductive means includes strip electrode means comprised of a conductive material plated on the top surface of the dielectric means, one end of the strip electrode means being coupled to the input electrode means, and the other end of the strip electrode means being coupled to signal ground; and wherein said shunt capacitive means includes electrode means comprised of a conductive material disposed on the top surface of the dielectric means at a predetermined distance from the electrode means of the capacitive means and being coupled to signal ground.

21. Apparatus for coupling a first signal from a signal source to output means and coupling a second signal from the output means to a signal sink, said apparatus comprising:

(a) first filtering means for coupling the first signal from the signal source to the output means, said first filtering means including at least one bandstop filtering means intercoupled by transmission line means for attenuating signals having frequencies in a stopband of frequencies including the frequency of second signal, said bandstop filtering means comprised of:

(i) means comprised of a dielectric material and having top and bottom surfaces, said dielectric means further including input electrode means comprised of a conductive material disposed on the top surface;

(ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and (iii) means for attaching the bottom surface of the first dielectric means to the top surface of the second dielectric means so that the input electrode means on the top surface of the first ceramic means is arranged substantially opposite to the hole in the second dielectric means; and (b) second filtering means for coupling the second signal froma the output means to the signal sink, said second filtering means including at least one bandstop filtering means intercoupled by transmission line means for attenuating signals having frequencies in a stopband of frequencies including the frequency of the first signal, said bandstop filtering means comprised of:

(i) first means comprised of a dielectric material and having top and bottom surfaces, said first dielectric means further including input electrode means comprised of a conductive material disposed on the top surface;

(ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and (iii) means for attaching the bottom surface of the first dielectric means to the top surface of the second dielectric means so that the input electrode means on the top surface of the first dielectric means is arranged substantially opposite to the hole in the second dielectric means.

22. The apparatus according to claim 21, wherein each of the bandstop filtering means in said first filtering means further includes shunt inductive means coupled between the input electrode means and signal ground, and wherein each of the bandstop filtering means in the second filtering means includes shunt capacitive means coupled between the input electrode means and signal ground.

23. The apparatus according to calim 21, wherein each of the bandstop filtering means in said first filtering means further includes shunt capacitive means coupled between the input electrode means and signal gournd, and wherein each of the bandstop filtering means in the second filtering means includes shunt inductive means coupled between the input electrode means and signal ground.

24. The combining apparatus according to claim 22 or 23, wherein said shunt inductive means includes strip electrode means comprised of a conductive material plated on the top surface of the first dielectric means, one end of the strip electrode means being coupled to the input electrode means, and the other end of the strip electrode means being coupled to signal ground; and wherein said shunt capacitive means includes first electrode means comprised of a conductive material plated on the top surface of the first dielectric means and second electrode means comprised of a conductive material plated on the bottom surface of the first dielectric means substantially opposite to the first electrode means, the first electrode means being coupled to the input electrode means, and the second electrode means being coupled to signal ground.

25. The apparatus according to claim 21, wherein said first filtering means includes transmission line means coupled between the signal source and signal ground, said transmission line means having a length such that its impedance is a maximum at the frequency of the first signal.

26. The apparatus according to claim 21 or 25, wherein said first filtering means includes transmission line means coupled between the bandstop filtering means and signal ground, said transmission line means having a length such that its impedance is a maximum at the frequency of the first signal.

27. The apparatus according to claim 21, 22 or 23, wherein the signal source comprises radio frequency (RF) transmitting means, the signal sink comprises RF receiving means and the output means comprises RF signal radiating means.

28. Apparatus for coupling a first signal from a first signal source and a second signal from a second signal source to output means, said apparatus comprising:
(a) first filtering means for coupling the first signal from the first signal source to the output means, said first filtering means including at least one bandstop filtering means intercoupled by transmission line means for attenuating signal having frequencies in a stopband of frequencies including the frequency of the second signal, said bandstop filtering means comprised of:
(i) means comprised of a dielectric material and having top and bottom surfaces, said dielectric means further including input electrode means comprised of a conductive material disposed on the top surface;
(ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and
(iii) means for attaching the bottom surface of the first dielectric means to the top surface of the second dielectric means so that the input electrode means on the top surface of the first ceramic means is arranged substantially opposite to the hole in the second dielectric means; and
(b) second filtering means for coupling the second signal from the second signal source to the output means, said second filtering means including at least one bandstop filtering means intercoupled by transmission line means for attenuating signals having frequencies in a stopband of frequencies including the frequency of the first signal, said bandstop filtering means comprised of:
(i) first means comprised of a dielectric material and having top and bottom surfaces, said first dielectric means further including input electrode means comprised of a conductive material disposed on the top surface;
(ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and
(iii) means for attaching the bottom surface of the first dielectric means to the top surface of the second dielectric means so that the input electrode means on the top surface of the first dielectric means is arranged substantially opposite to the hole in the second dielectric means.

29. The apparatus according to claim 28, wherein each of the bandstop filtering means in said first filtering means further includes shunt inductive means coupled between the input electrode means and signal ground, and wherein each of the bandstop filtering means in the second filtering means includes shunt capacitvie means coupled between the input electrode means and signal ground.

30. The apparatus according to claim 28, wherein each of the bandstop filtering means in said first filtering means further includes shunt capacitive means coupled between the input electrode means and signal ground, and wherein each of the bandstop filtering means in the second filtering means includes shunt inductive means coupled between the input electrode means and signal ground.

31. The apparatus according to claim 29 or 30, wherein said shunt inductive means includes strip electrode means comprised of a conductive material plated on the top surface of the first dielectric means, one end of the strip electrode means being coupled to the input electrode means, and the other end of the strip electrode means being coupled to signal ground; and wherein said shunt capacitive means includes first electrode means comprised of a conductive material plated on the top surface of the first dielectric means and second electrode means comprised of a conductive material plated on the bottom surface of the first dielectric means substantially opposite to the first electrode means, the first electrode means being coupled to the input electrode means, and the second electrode means being coupled to signal ground.

32. The apparatus according to claim 28, wherein said first filtering means includes transmission line means coupled between the signal source and signal ground, said transmission line means having a length such that its impedance is a maximum at the frequency of the first signal.

33. The apparatus according to claim 28 or 32, wherein said first filtering means includes transmission line means coupled between the bandstop filtering means and signal ground, said transmission line means having a length such that its impedance is a maximum at the frequency of the first signal.

34. The combining apparatus according to claim 28, wherein said second filtering means includes transmission line means coupled between the signal source and signal ground, said transmission line means having a length such that its impedance is a maximum at the frequency of the first signal.

35. The apparatus according to claim 28 or 34, wherein said second filtering means includes transmission line means coupled between the bandstop filtering means and signal ground, said transmission line means having a length such that its impedance is a maximum at the frequency of the first signal.

36. The apparatus according to claim 28, 29 or 30, wherein the first signal source comprises first radio frequency (RF) transmitting means, the second signal source comprises second RF transmitting means and the output means comprises RF signal radiating means.

37. Apparatus for coupling a first signal from input means to a first signal sink and coupling a second signal from the input means to a second signal sink, said apparatus comprising:
 (a) first filtering means fro coupling the first signal from the input means to the first signal sink, said first filtering means including at least one bandstop filtering means intercoupled by transmission line means for attenuating signals having frequencies in a stopband of frequencies including the frequency of the second signal, said bandstop filtering means comprised of:
  (i) means comprised of a dielectric material and having top and bottom surfaces, said dielectric means further including input electrode means comprised of a conductive material disposed on the top surface;
  (ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and
  (iii) means for attaching the bottom surface of the first dielectric means to the top surface of the second dielectric means so that the input electrode means on the top surface of the first ceramic means is arranged substantially opposite to the hole in the second dielectric means; and
 (b) second filtering means for coupling the second signal from the input means to the second signal sink, said second filtering means including at least one bandstop filtering means intercoupled by transmission line means for attenuating signals having frequencies in a stopband of frequencies including the frequency of the first signal, said bandstop filtering means comprised of:
  (i) first means comprised of a dielectric material and having top and bottom surfaces, said first dielectric means further including input electrode means comprised of a conductive material disposed on the top surface;
  (ii) second means comprised of a dielectric material and having top and bottom surfaces, said second dielectric means further including a hole extending from the top surface to the bottom surface thereof, said second dielectric means further being covered entirely with a conductive material with the exception of the top surface, and said conductive material being coupled to signal ground; and
  (iii) means for attaching the bottom surface of the first dielectric means to the top surface of the second dielectric means so that the input electrode means on the top surface of the first dielectric means is arranged substantially opposite to the hole in the second dielectric means.

38. The apparatus according to claim 37, wherein each of the bandstop filtering means in said first filtering means further includes shunt inductive means coupled between the input electrode means and signal ground, and wherein each of the bandstop filtering means in the second filtering means includes shunt capacitive means coupled between the input electrode means and signal ground.

39. The apparatus according to claim 37, wherein each of the bandstop filtering means in said first filtering means further includes shunt capacitive means coupled between the input electrode means and signal ground, and wherein each of the bandstop filtering means in the second filtering means includes shunt inductive means coupled between the input electrode means and signal ground.

40. The combining apparatus according to claim 38 or 39, wherein said shunt inductive means includes strip electrode means comprised of a conductive material plated on the top surface of the first dielectric means, one end of the strip electrode means being coupled to the input electrode means, and the other end of the strip electrode means being coupled to signal ground; and wherein said shunt capacitive means includes first electrode means comprised of a conductive material plated on the top surface of the first dielectric means and second electrode means comprised of a conductive material plated on the bottom surface of the first dielectric means substantially opposite to the first electrode means, the first electrode means being coupled to the input electrode means, and the second electrode means being coupled to signal ground.

* * * * *